United States Patent

Niemi

[11] Patent Number: 5,322,335
[45] Date of Patent: Jun. 21, 1994

[54] AUTOMOTIVE FLOOR LINER

[75] Inventor: Karl A. Niemi, Waunakee, Wis.

[73] Assignee: Penda Corporation, Portage, Wis.

[21] Appl. No.: 114,097

[22] Filed: Aug. 30, 1993

[51] Int. Cl.⁵ .............................................. B62D 25/00
[52] U.S. Cl. .................................. 296/97.23; 296/39.1
[58] Field of Search .................... 296/97.23, 39.1, 37.16

[56] References Cited

U.S. PATENT DOCUMENTS

| | | | |
|---|---|---|---|
| 2,898,146 | 8/1959 | Yudenfreund | 296/39 |
| 3,011,822 | 12/1961 | May et al. | 296/66 |
| 3,317,238 | 5/1967 | Smoll | 296/69 |
| 3,476,432 | 11/1969 | Aliment et al. | 296/23 |
| 4,279,439 | 7/1981 | Cantieri | 396/39 |
| 4,443,034 | 4/1984 | Beggs | 296/65 |
| 4,848,826 | 7/1989 | Kuwabara et al. | 296/97.23 |
| 4,944,612 | 7/1990 | Abstetar et al. | 296/97.23 |
| 4,979,772 | 12/1990 | Carey et al. | 296/39.1 |
| 5,215,345 | 6/1993 | Orphan | 296/39.1 |

Primary Examiner—Joseph D. Pape
Attorney, Agent, or Firm—Lathrop & Clark

[57] ABSTRACT

Protection for the rear carpet areas of an automobile such as a sport utility vehicle is provided by a unitary sheet of heavy-gauge extruded, high-density polyethylene. The floor liner has a floor panel which covers the floor of the cargo area of a sports utility vehicle. The floor panel has sides which extend along and are tucked under the wheel well trim panels on either side of the cargo area. Integrally formed with, and attached to, the forward edge of the floor panel, are two cargo extension panels. The cargo extension panels form a continuation of the forward edge of the cargo floor panel and are separated from each other by a seat back accommodation slot. This slot divides the cargo extension panels so that each panel corresponds to the width of the seat back positioned forward of each panel. Continuing on from the cargo extension panels are recumbent panels which are integrally formed with and joined to the cargo panels. These in turn are joined to integrally formed seat back panels. The joints between the panels are of the type known as a "living hinge" and are cold-formed into the material of the liner itself. The double living hinges provide resilient, long-life hinges impervious to liquids and provide flat extended edges of improved appearance and safety. The spring-loaded extension panel of a vehicle urges the seat back panel against a seat back and hence retains the liner without additional fasteners.

20 Claims, 6 Drawing Sheets

AUTOMOTIVE FLOOR LINER

FIELD OF THE INVENTION

This invention relates to automobile floor coverings in general, and to floor coverings for the rear cargo areas of automobiles and sport utility vehicles in particular.

BACKGROUND OF THE INVENTION

The class of vehicles known as sports utility has found growing popularity among consumers. This type of vehicle, exemplified by the Ford Explorer, includes such vehicles as the Chevy S-10 Blazer, the GMC Jimmy, the JEEP Cherokee, and the Oldsmobile Bravada, as well as foreign models including the Isuzu Rodeo, Mitsubishi Montero, Nissan Pathfinder, and the Toyota 4-Runner. The reason for their popularity is associated with their truck-like performance, including four-wheel drive, with a somewhat roomier stationwagon-like interior. The sports utility vehicle is characterized by having rear seats that fold forward to expand a rear cargo area which may be accessed through a rear hatch-back door. The sports utility vehicle is typically available in three- and five-door models and is well-suited to modern lifestyles, providing the benefits of a truck when towing, driving off-road, or serving as a week-ender's utility vehicle. During the week, it handles city traffic and is equipped with the conveniences and small luxuries which the American driver has come to expect in a modern automobile.

One problem, though, can intrude between the synergistic mating of the automobile and truck, which is the essence of the sports utility vehicle. That conflict centers on the cargo area. The very essence of a truck is the ability to transport cargo from point to point. The Sports Utility Vehicle is admirably adapted to do just that. However, many objects and materials which one would not hesitate to haul about in a truck would not generally be considered compatible with the back seat of a car. The carpet covering of the vehicle's cargo area is susceptible to damage and soiling from contact with tools, equipment, supplies, and other objects which may commonly be hauled.

Various covers for rear cargo areas have been developed. However, these prior articles, in order to provide coverage for the cargo area when the seat backs are both elevated and collapsed, have typically employed a plurality of separable but interengaged units, which are not only costly to manufacture, but require assembly, run the risk of separating, and are susceptible to the penetration of liquids to the carpet beneath.

What is needed is a protective system that will protect the cargo area and the rear of the back seats of a sports utility vehicle which is readily cleanable, resists marring, and presents an attractive appearance compatible with a car interior.

SUMMARY OF THE INVENTION

The floor liner of this invention is constructed of a single unitary piece of heavy-gauge extruded high-density polyethylene. The floor liner has a floor panel which covers substantially the entire floor of the cargo area of a sports utility vehicle. The floor panel has a rear end adjacent to the rear door of the vehicle, and a forward end adjacent to the rear seat of the vehicle. The floor panel sides extend along and are tucked under the vehicle wheel well trim panels on either side of the cargo area. Left and right ears extend from the left and right rear corners of the floor panel behind the left and right wheel well trim panels. There are four cargo hook access holes, two spaced along each side of the floor panel, and positioned to overlie the cargo hooks in the floor of the vehicle cargo area.

Two cargo extension panels are integrally formed with, and attached to, the forward edge of the floor panel. The cargo extension panels form a continuation of the forward edge of the cargo floor panel and are separated from each other by a frontwardly extending cut-away seat back accommodation slot. Each panel corresponds to the width of the seat back positioned forward of each cargo extension panel. Thus, the cargo area may be extended by folding forward one or both of the two rear seat backs.

Recumbent panels extend forwardly from the cargo extension panels. Seat back panels extend forwardly from the recumbent panels. The joints between the seat back panels and the recumbent panels, and between the recumbent panels and the cargo extension panels, and between the cargo extension panels and the cargo floor panel, are of the type known as a "living hinge" formed from the material of the liner itself. The living hinges which join the panels and provide hinging flexure between the panels are compound hinges formed of two parallel, closely spaced living hinges which are cold-formed into the material of the liner. The double living hinges provide a resilient, long-lasting hinge which is impervious to liquids. The double hinge further provides flat extended edges of improved appearance and safety.

One type of sports utility vehicle has a spring-loaded cargo bed extension which fills the gap between the back seats and the cargo bed when the seats are collapsed forward to provide greater cargo room. In one embodiment of the invention, the cargo extension member of the sports utility vehicle is used to bias and support the cargo extension panel, the recumbent panel, and the seat back panel, in an upright position adjacent to the rear seat of the sports utility vehicle. When the rear seats are collapsed forward the length of the three-hinged panels (the seat back panels, the recumbent panel, and the cargo extension panel), is such that when they are extended flat to lie in the plane of the cargo panel, they cover the cargo extension member and the rear seat backs of the vehicle.

It is an object of the present invention to provide an automotive floor liner which is impervious to liquids.

It is another object of the present invention to provide an automotive floor liner constructed in one piece which is also expandable.

It is a further object of the present invention to provide an automotive floor liner which underlies the wheel well trim panel of a sports utility vehicle.

It is a still further object of the present invention to provide an automotive floor liner of attractive appearance with a durable, easily cleaned surface.

It is yet another object of the present invention to provide an automotive floor liner which may be cost-effectively formed by cold pressing from extruded, high-density polyethylene.

Further objects, features and advantages of the invention will be apparent from the following detailed description when taken in conjunction with the accompanying drawings.

DESCRIPTION OF THE PREFERRED EMBODIMENTS

Figure 1:
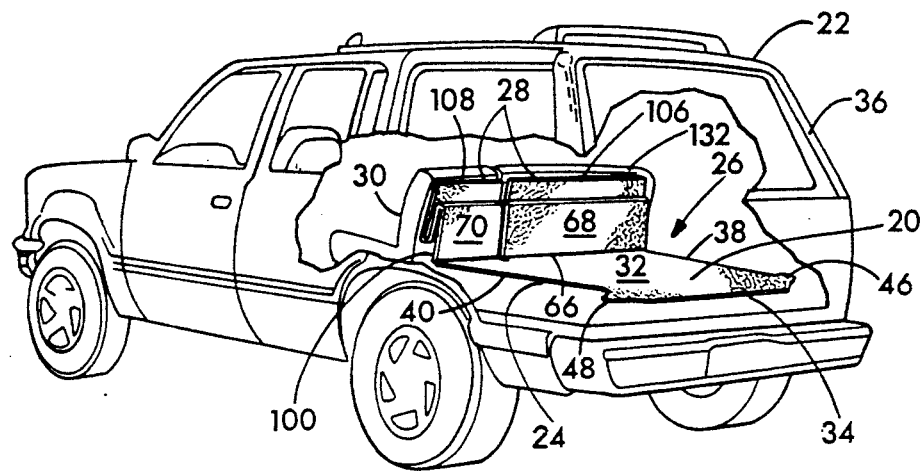
FIG. 1 is a perspective view of the floor liner of this invention installed in a sports utility vehicle, partly cut away.

Referring more particularly to FIGS. 1–13C, wherein like numbers refer to similar parts, an integral plastic floor liner 20 is shown in FIG. 1–5A. The floor liner 20, as shown in FIG. 1, is designed for installation in a sports utility vehicle 22. The liner 20 protects the floor 24 of the rear cargo area 26 of the sports utility vehicle 22. The liner 20 also protects the rear seat back surfaces 28 of the rear seats 30 or the vehicle 22. The liner 20 is formed from a single sheet of extruded plastic which has depressions pressed into it to define horizontally extending living hinges. The hinges divide the liner 20 into panels. A floor panel 32 covers the floor 24; cargo extension panels 68, 70 cover the rear seat backs 28; and recumbent panels 110, 112, and seat back panels 114, 116 provide an expandable cover for the collapsed seat back.

Figure 3:
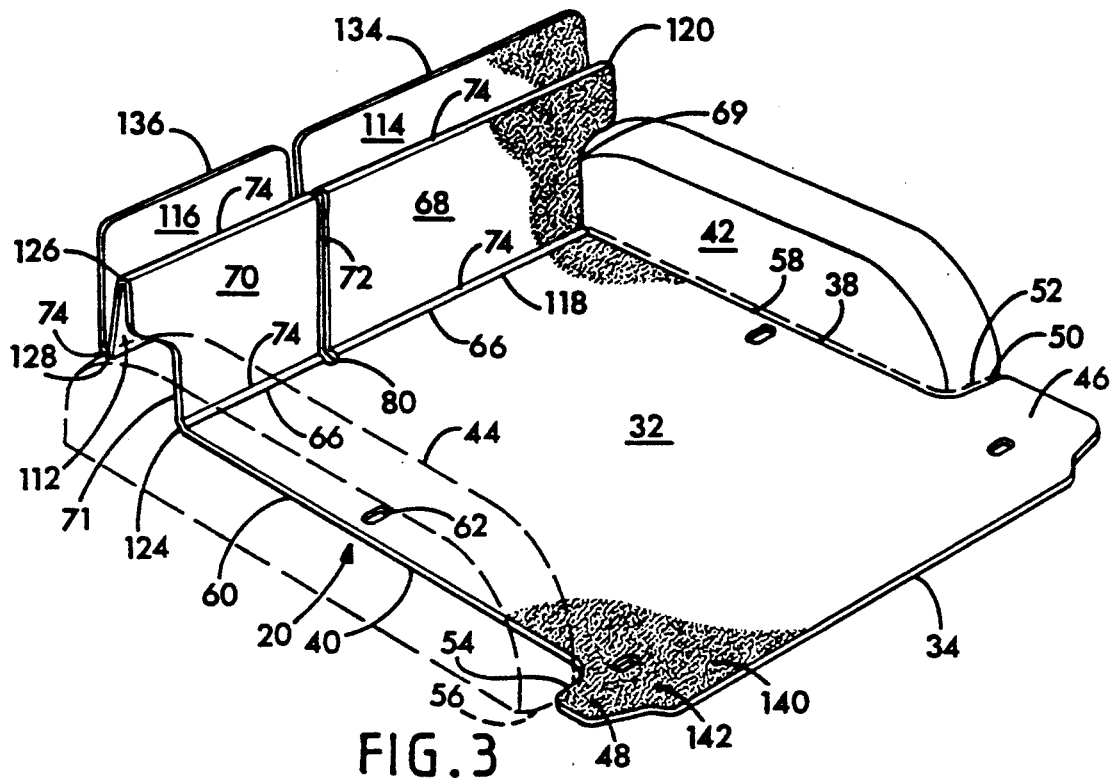
FIG. 3 is an isometric view of the floor liner of FIG. 1 shown in relation to the interior wheel wells of a sports utility vehicle.

The floor liner 20 floor panel 32 substantially covers the floor of the cargo area 24. The floor panel 32 has a rear end 34 adjacent to the rear door 36 of the vehicle 22. The floor panel 32 has a right side 38 and a left side 40. As shown in FIG. 3, the right side 38 of the floor panel 32 lies parallel to and is tucked under a right wheel trim panel 42. Similarly, the left side 40 of the floor panel 32 is tucked under the left wheel trim panel 44.

The floor panel 32 has a right ear 46 and a left ear 48 which extend from the sides 38, 40 adjacent to the rear edge 34 of the floor panel 32. The right ear 46 has a forward edge 50 which is tucked under the rearward edge 52 of the right wheel trim panel 42. Similarly, the left ear 48 has a forward edge 54 which extends under the rearward edge 56 of the left wheel well trim panel 44. The right ear 46 extends for a slightly greater distance along the right floor panel side 38 than the left ear 48 extends along the left floor panel side 40. The ears 46, 48 and the floor panel 32 generally conform to the floor of the cargo area 24.

The wheel trim panels 42, 44 overlie the forward edges 50, 54 of the ears 46, 48 together as well as portions 58, 60 of the floor panel sides 38, 40. This engagement of the liner 20 beneath the wheel trim panels 42, 44 serves to position and hold the floor liner 20 in position overlying the floor 24 of the cargo area 26.

Figure 4:
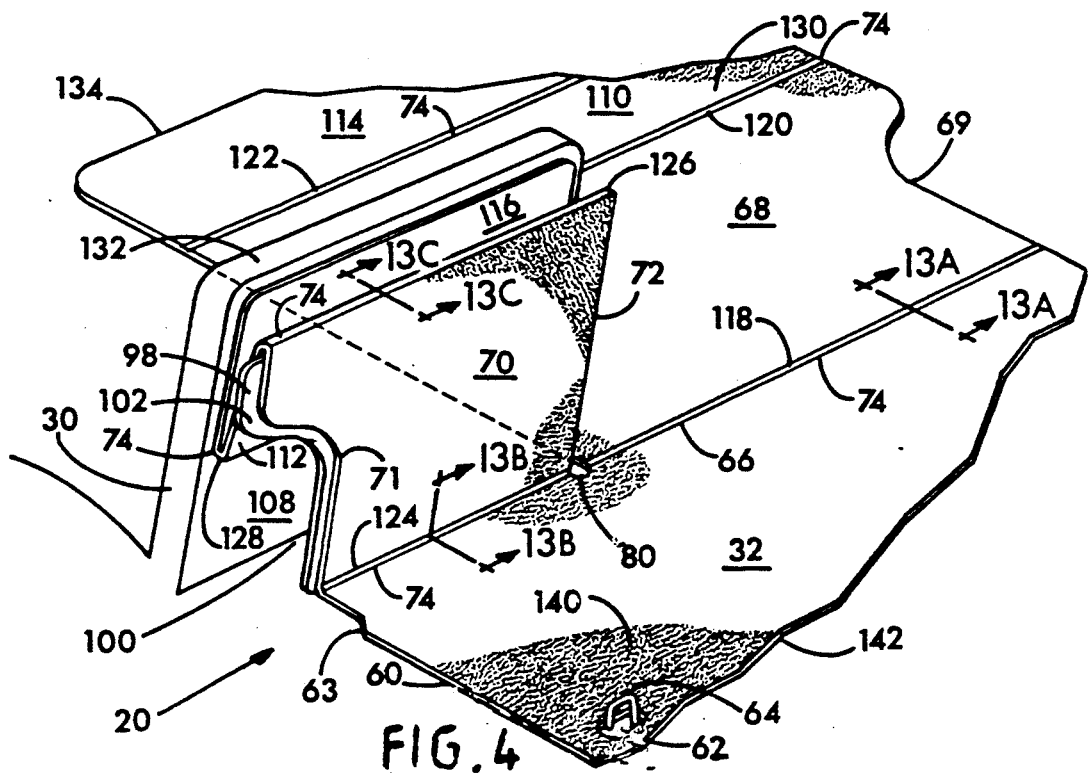
FIG. 4 is a fragmentary isometric view of the floor liner of FIG. 1 with one expansion flap shown folded and another expanded.

The floor panel 32 has four cargo hook access holes 62 which allow access to cargo hooks 64, best shown in FIG. 4.

The vehicle 22 has rear seats 30 which may extend upwardly for carrying passengers, and which may be collapsed frontwardly to expand the cargo area of the vehicle. When collapsed the seat backs 28 are coplanar with the cargo area floor and form an extension of the cargo area. In some vehicles there may be a gap between the collapsed seat back and the cargo area floor, but often a hinged metal extension flap 98 is provided by the manufacturer to bridge this gap. Typically the seat backs 28 are carpeted to match the cargo area floor 24.

Figure 13C:
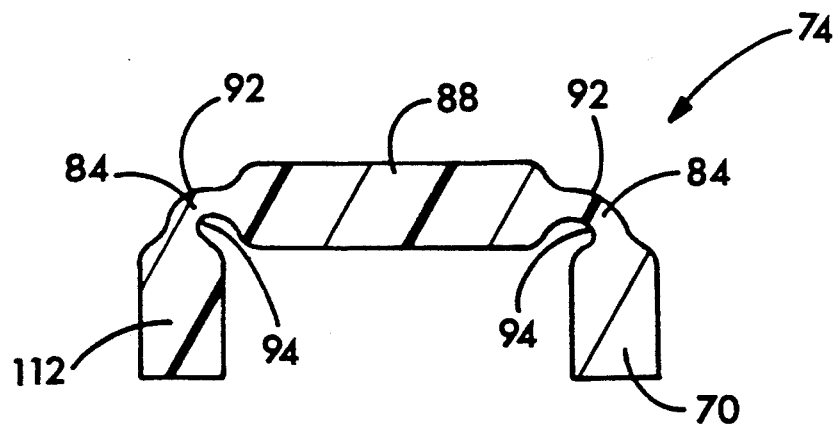
FIG. 13C is a cross-sectional view taken along section line 13C—13C of FIG. 4.
Figure 13B:
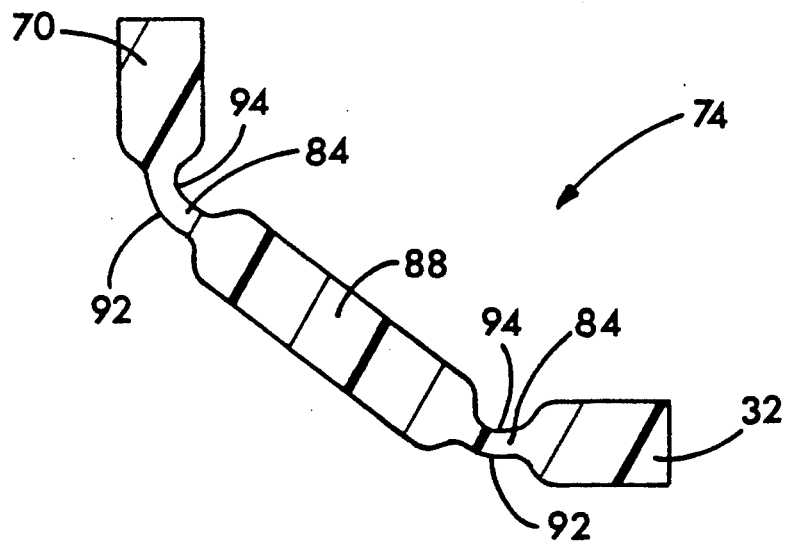
FIG. 13B is a cross-sectional view taken along section line 13B—13B of FIG. 4.
Figure 13A:
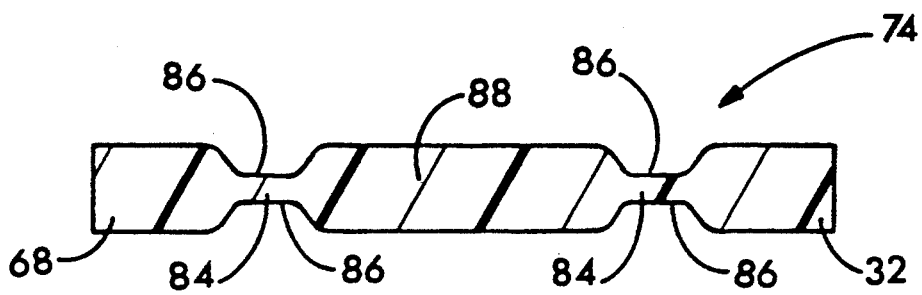
FIG. 13A is a cross-sectional view taken along section line 13A—13A of FIG. 4.

The forward end 66 of the floor panel 32 is adjacent to the rear seats 30 of the vehicle 22. The two cargo extension panels 68, 70 are integrally joined to and formed with the floor panel 32. The right cargo extension panel 68 and a the left cargo extension panel 70 extend frontwardly from the floor panel 32 along a double living hinge 74, and are separated from each other by a frontwardly opening seat back accommodation slot 72. The double living hinge 74 is composed of two parallel and closely spaced individual living hinges 84, best shown in FIGS. 13A through C. "Living hinge" is a term of art in the plastics industry referring to a hinge made out of the parent material from which the object incorporating the hinge is constructed. Normally, living hinges are co-formed with the plastic object of which they form a part and are thus created by the injection molding process or the thermoforming process. The double living hinge 74 employed in the floor liner 20 is cold-pressed by a metal die into the floor liner 20, forming a neck 86. The neck 86 renders the liner flexible, creating a living hinge 84. Two living hinges 84 are spaced apart approximately ⅜ of an inch to form the double living hinge 74 as shown in FIG. 13A–13C. The ⅜ inch wide hinged strip 88 formed between the living hinges 84 structurally isolates the living hinges 84 from each other and forms an attractive, blunted edge 90, best shown in FIGS. 10 and 11.

The double living hinge 74 between the floor panel 32 and the extension panels 68, 70 is divided by the slot 72 into a right hinged joint 118 and a left hinged joint 124.

Each hinged joint provides a pivotable connection between an extension panel 68, 70 and the floor panel 32.

The seat back accommodating slot 72 has a stress-relieving bottom 80 which extends into the floor panel 32 a short distance beyond the line 82 defined by the double living hinge 74 between the cargo extension panels 68, 70 and the floor panel 32. The extension of the seat back accommodation slot 72 into the floor panel 32 serves an important structural function. The bottom of a slot is normally an area of high stress, particularly in the floor liner 20 where the panels 68, 70 are independently hinged on either side of the slot. By extending the slot bottom 80 into the floor panel 32, and further by terminating the slot bottom 80 in a gentle curve, two functions are achieved. First, the gentle curve spreads the stresses out, allowing the maximum amount of liner material to resist the tearing or shearing force which may develop at the slot bottom 80. Second, the slot bottom 80 is positioned not within the reduced thickness of the hinge neck, but within the full thickness of the floor panel 32, which has a thickness of approximately eithty thousandths inches. Thus any shearing or tearing force developed by the differential movement of the right hinge joint 118 and the left hinge joint 124 will be resisted by the full thickness of the body of the floor panel 32.

The floor liner 20 is constructed from high density polyethylene, which is a tough, tear-resistant material. This toughness is also important in resisting tearing at the bottom 80 of the slot 72.

Referring to FIGS. 13B and C, the living hinges 84 function by the resilient deformation of the high-density polyethylene from which they are formed. The outside portions 92 of the hinge neck 86 are put in tension when the living hinges 84 are bent. At the same time, the neck inside portions 94 are put in compression. As is apparent from FIGS. 13A, B, and C, the greater the angle about which the hinge is bent, the greater the tension and compressive strains induced in the hinge neck 86. Excessive strain in the hinge neck 86 can lead to eventual failure of the living hinge 84. The use of two living hinges joined by a central hinge strip 88 reduces by half the angle through which each hinge 84 must be bent. For example, in FIG. 13B, the double living hinge 74 forms an angle of 90 degrees between the floor panel 32 and the cargo extension panel 70. However, each living hinge 84 experiences a 45 degree bend.

Similarly, in FIG. 13C, the double living hinge 74 is shown forming a 180 degree angle between the cargo extension panel 70 and the recumbent panel, yet each of the living hinges 84 in FIG. 13C is only bent through a 90 degree angle. Accordingly, the life of the double living hinge greatly exceeds that of a single living hinge and facilitates the long life and durability which is desired of the floor liner 20.

The formation of the living hinges 84 by cold-pressing requires a material which does not excessively work harden or lose its resiliency in response to the cold-working associated with cold-pressing. High density polyethylene of approximately 80 thousandths of an inch thickness, when cold-pressed to form hinges of 35 thousandths nominal width, has proven effective in practice.

As shown in FIG. 4, the sports utility vehicle 22 is equipped with a spring loaded cargo bed extension flap 98 which is hinged to the cargo floor and fills the gap 100 formed between the floor of the cargo area 24 and the rear seat back surface 28 when the rear seat back of the vehicle 30 is collapsed forward. The cargo bed extension flap 98, shown in FIGS. 4, 5, 5A, 9 and 9A, is divided into two portions, a right portion (not shown) and the left portion 102. Each portion of the spring loaded cargo bed extension flap 98 is approximately as wide along the forward end 104 of the cargo area 26 as the right seat back 106 and the left seat back 108 respectively.

The liner 20 is configured to cooperate with the metal extension flap 98 to retain the protective panels of the liner engaged against the rear seat backs while eliminating the necessity of in any way connecting the liner to the seat backs. The coverage for the portion of the seat back which is exposed above the metal extension flap 98 is provided by the seat back panels 114, 116. The seat back panels are hinged to recumbent panels 110, 112, and both sets of panels are pressed against the seat backs by the spring-loaded metal extension flap 98.

The right recumbent panel 110 and the left recumbent panel 112 are co-extensive with and joined by double living hinges 74 to the right cargo extension panel 68 and left cargo extension panel 70 respectively. The recumbent panels 110, 112 are in turn joined to the co-extensive right seat back panel 114 and left seat back panel 116 by double living hinges 74.

As shown in FIG. 4, when the seat backs are in an upright position, the extension panels overlie the metal extension flap, and the flap 98 is sandwiched between the folded liner extension panel and recumbent panel. The seat back panel is hinged to the recumbent panel and extends upwardly to cover the rear seat back. When the rear seat is folded down to extend the vehicle cargo area, the recumbent and seat back panels are released from underneath the vehicle extension flap 98 and are laid out flat to cover the seat back in its collapsed position. A user need not release any fasteners or in any way connect the liner in either configuration.

Figure 2:
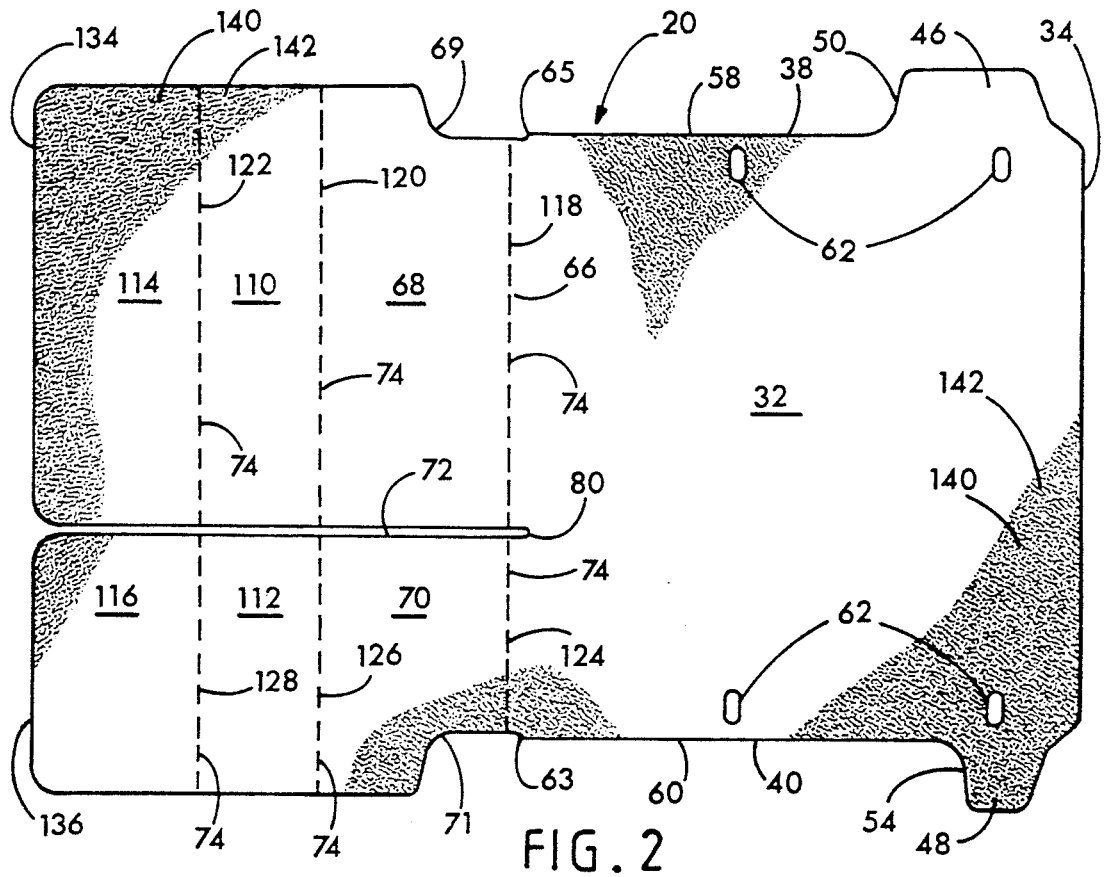
FIG. 2 is a top plan view of the floor liner of FIG. 1.

As shown in FIG. 2, the cargo floor liner 20 floor panel 32 has two sets of three hinged panels along its forward end 66. The set corresponding to the right seat back 28 includes a right cargo extension panel 68, joined by a first right hinge 118 to the floor panel 32; a right recumbent panel 110 joined by a second right hinge 120 to the right cargo extension panel 68; and a right seat back panel 114, joined by a third right hinge 122 to the right recumbent panel 110.

The set of panels corresponding to the left rear seat back includes a left cargo extension panel 70 joined by a first left hinge 124 to the floor panel 32; a left recumbent panel 112 joined by a second left hinge 126 to the left cargo extension panel 70; and a left seat back panel 116 joined by a third left hinge 128 to the left recumbent panel 112.

The right panels 68, 106, 110 are divided from the left panels 70, 108, 112 by the seat back accommodation slot 72. Each of the hinges 118, 120, 122 is co-linear with the opposed hinge 124, 126, 128 in corresponding left and right panels.

The floor liner 20 is designed to cover the cargo area 26 exposed when the rear seats 30 of the vehicle 22 are in the upright position as well as the extended cargo area 130 which is exposed when one or more of the rear seat backs 106, 108 is folded forward. To accomplish this, the floor liner 20 is designed according to the following rule:

1. The length of the cargo area 26 is measured along the floor 24 from the rear of the cargo area to the forward end of the cargo area (this distance is equivalent to the length of the liner floor panel 32 from the rear edge 34 to the forward end 66). The distance from the rear of the cargo area to the top 132 of the seat back surface 28 is added to this measurement to obtain the upright coverage length.
2. Next the length of the extended cargo area 130 is measured. This is the distance between the rear edge 34 and the top of the seat back 132 when the seat backs 106, 108 are in the forward collapsed condition.
3. The length of the upright coverage length is subtracted from the extended cargo area length to yield the expansion length.
4. The expansion length is divided in half and is used as the length of the recumbent panels 110, 112.
5. The length of the cargo extension panels 68, 70 is chosen to slightly exceed the length of the spring loaded cargo bed extensions 98. The seat back panels 114, 116 are then chosen with sufficient length so that the seat back panel forward edges 134, 136 reach the top of the seat back 132.

In other words:

$$\text{length of recumbent panel} = \frac{(\text{length of extended cargo area} - \text{upright coverage length})}{2}$$

Because the length of the recumbent panels 110, 112 is subtracted from the overall length of the floor liner 20 when in the upright portion, but is added to the overall length when the liner 20 is in the recumbent portion, it has the effect of extending the floor liner by twice its own length, which is the needed expansion length.

Figure 5:
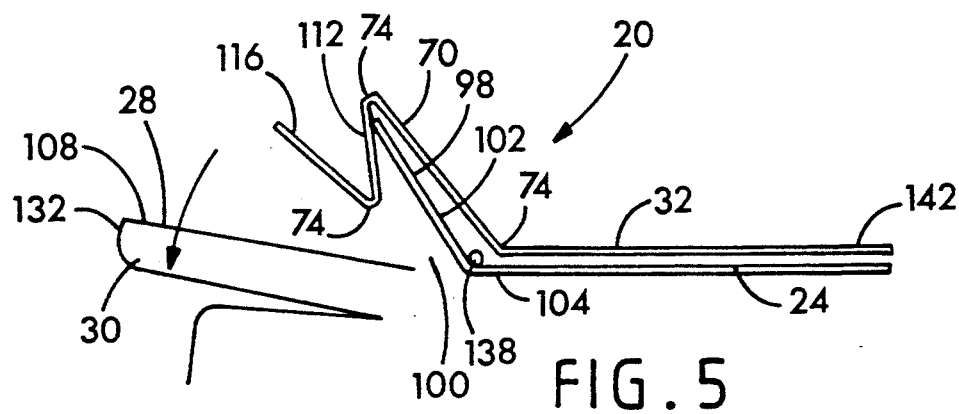
FIG. 5 is a side elevational view of the floor liner of FIG. 1 undergoing installation to cover the seat back of the rear seat of an expanded cargo area.
Figure 5A:
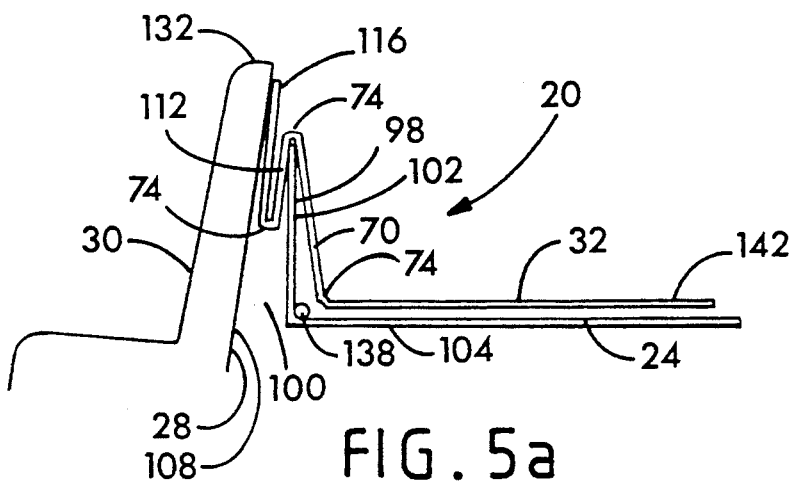
FIG. 5a is a side elevational view showing the floor liner of FIG. 1 installed with an upright rear seat back.

The function of the spring loaded cargo bed extension flap 98 is illustrated in FIGS. 5 and 5A where the left spring-loaded bed extension flap 102 is shown in FIG. 5A to support and hold the left cargo extension panel 70, left recumbent panel 112, and left seat back panel 116, in a collapsed but upright position against the rear seat back 108. Similarly, the right spring loaded bed extension flap (not shown) biases and supports the right panels 68, 110, 114 against the right rear seat back 106. The spring loaded cargo bed extension has a hinge 138 which incorporates a spring (not shown), which biases the cargo bed extension flap 98 to a flat or recumbent position.

Further improving the function and appearance of the floor liner 20 is the leather-grained texture 140 which is formed in the cargo-engaging upper surface 142 of the floor liner 20. The leather-grained surface 140 is formed into the material from which the floor liner 20 is made. High-density polyethylene is extruded to form sheets which are then rolled between rollers to achieve the final thickness of approximately 80 thousandths of an inch. The surface of the upper roller employed has a leather-grain texture formed thereon, and therefore imparts a leather-grained surface to the floor liner 20. The floor liner 20 is manufactured from appropriate sheet shock by a punching operation which cuts the liner 20 to size in a cold-forming operation which also forms the living hinges 84.

The leather-grain surface by itself or in combination with a co-extruded plastic layer with a high coefficient of friction provides a durable, tough surface impervious to water and most chemicals. This surface may also be easily cleaned by removing the liner from the vehicle and scrubbing it down with a mild detergent and cold water. Further, the textured surface tends to hide any slight scratches which accumulate on the tough, mar-resistant plastic liner. Because the liner is formed of a homogenous material in which the pigment is continuous throughout the depth of the liner material, scratching or marring the liner does not produce a surface of varying color.

In forming the living hinges 84, it may be desirable to leave a small band of undeformed material approximately the width of the floor liner thickness between the living hinge and the edges of the floor liner to reduce the possibility of the liner tearing along one of the living hinges 84.

The right cargo extension panel 68 has a right wheel cut-out 69, which has a side 65 which is off-set from the right floor panel, side 38, so that the right cargo extension panel 68 may freely swing into an upright position by accommodating the right wheel trim panel 42. Similarly, the left cargo extension panel 70 has a wheel cut-out 71, with a side 63, which extends inward of the left floor panel side 40, so accommodating the left wheel trim panel 44.

An alternative floor liner 220 of the present invention is shown in FIGS. 6, 7, 8, 9, and 9A. The floor liner 220 is also adapted for use with a four-door sports utility vehicle 22. The floor panel 232 is similar to the floor panel 32. It has side panels 238, 240 which tuck under the wheel trim panels 42, 44 and has sideward extending ears 246, 248

Figure 8:
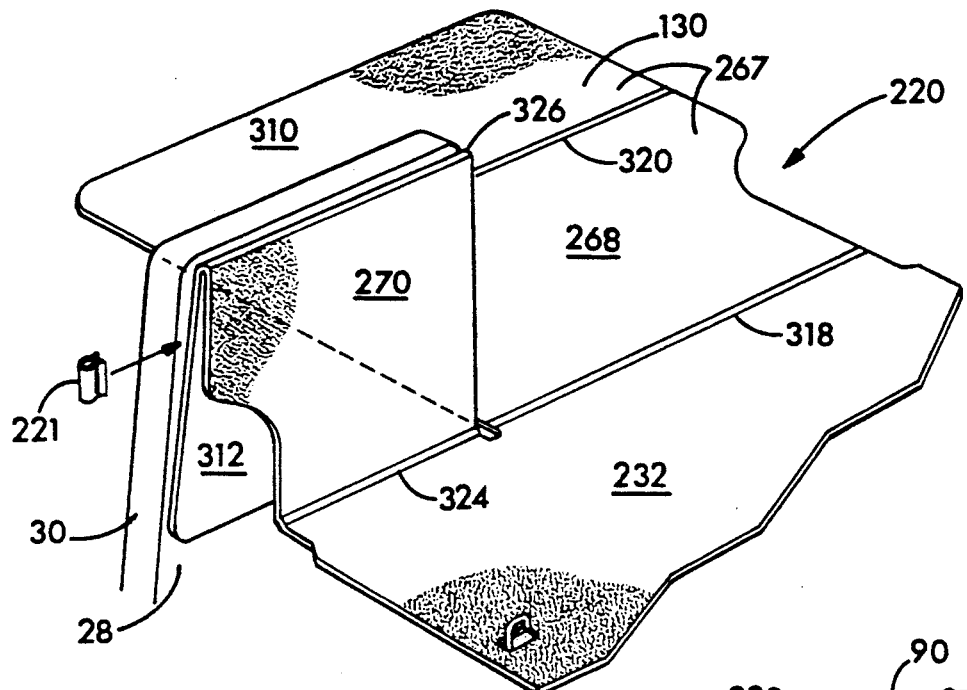
FIG. 8 is a partial isometric view of the floor liner of FIG. 6 with one expansion panel shown folded and one expanded.
Figure 9:
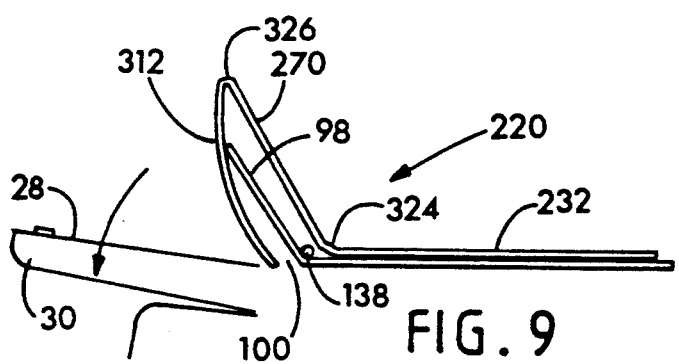
FIG. 9 is a side elevational view of the floor liner of FIG. 6 showing how the floor liner may be expanded to cover the seat back of the rear seat of an expanded cargo area.
Figure 9A:
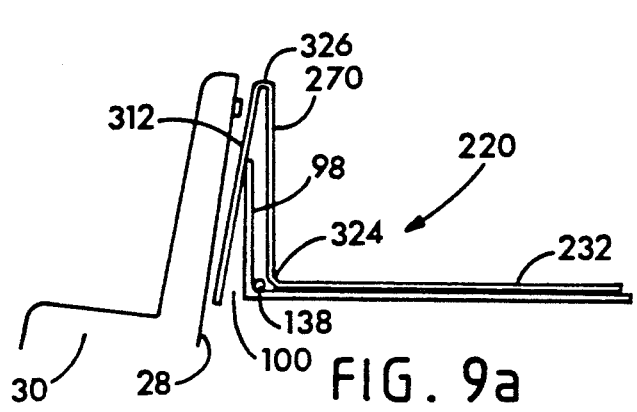
FIG. 9A is side elevational view showing the installation of the floor liner of FIG. 6
Figure 11:
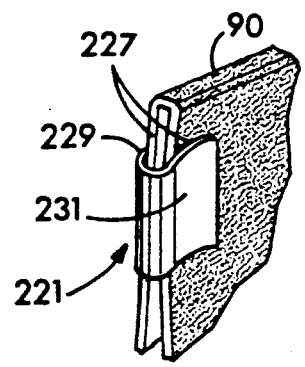
FIG. 11 is a fragmentary isometric view of the clip of FIG. 10 installed as in FIG. 7.

The floor liner 220 differs from the floor liner 20 in having a forward extension 267 composed of two sets of two panels, a right cargo extension panel 268 and left cargo extension panel 270, and a right recumbent panels 310 and a left recumbent panels 312. The recumbent panels 310, 312 are joined to the extension panels 268, 270 by double living hinges 320, 326. The cargo extension panels 268, 270 are joined to the forward end 266 of the floor panel 232 by double living hinges 318, 324. The design of the floor liner 220 is accomplished by making the cargo extension panels 268, 270 of sufficient height to extend to the tops 132 of the rear seat backs 106, 108. The recumbent panels 310, 312 are then chosen with a length equal to the difference between the length of the cargo area 26 and the length of the extended cargo area 130. Because the recumbent panels 310, 312 do not add or subtract from the length of the floor liner 220 when they are in their stowed position as shown in FIGS. 7, 8 and 9A, and add when they are in their extended position as shown in FIG. 8, it is necessary only that they be as long as the extension, achieves the desired adjustability in the floor liner 220.

Figure 7:
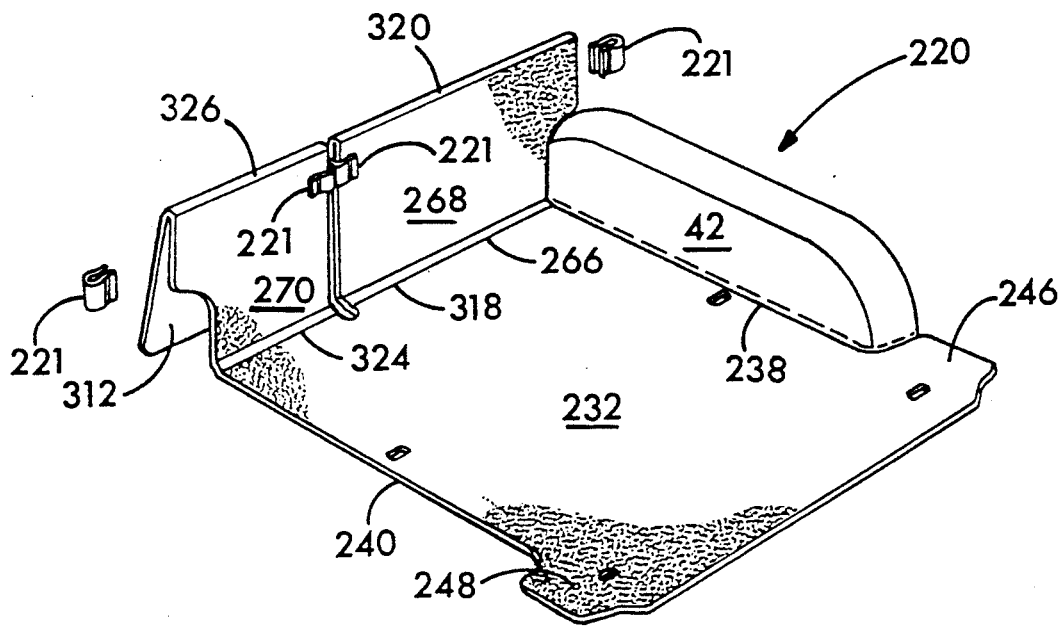
FIG. 7 is an isometric view of the configuration of the floor liner of FIG. 6, with fasteners partly exploded, as installed in a Ford Explorer sports utility vehicle.
Figure 6:
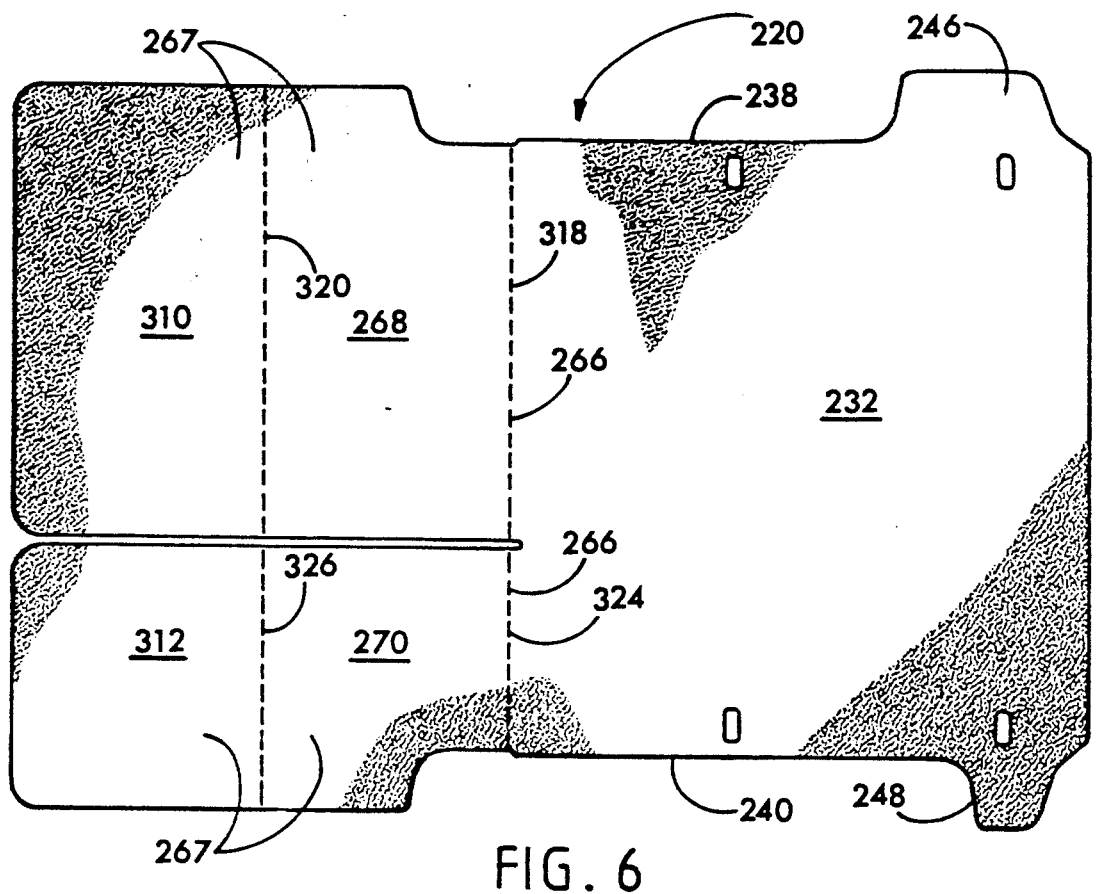
FIG. 6 is a plan view of an alternate embodiment of the floor liner of FIG. 1.

In addition to utilizing the spring loaded cargo bed extension flap 98 to position the forward extensions 267 of the floor liner 220 against the rear seat back surfaces 28, four clips 221 are employed as shown in FIG. 7. The clips 221 are shown in more detail in FIGS. 10 and 11. The clip 221 is backed with mushroom heads 223, which attach the clips 221 to the carpet backing (not shown) of the seat back surface 28. The mushroom heads 223 are similar to the hook portions of a hook and loop fastener such as that manufactured under the trade name VELCRO. The clips 221, once positioned on the seat back rear surfaces 28, are retained by the fasteners 223.

Figure 10:
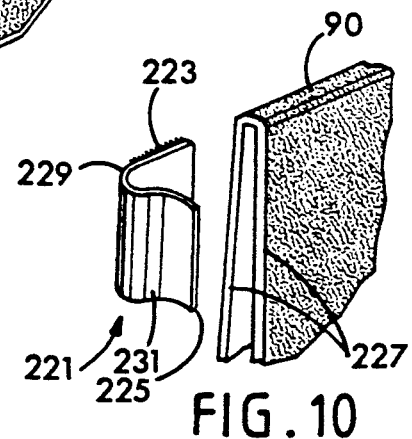
FIG. 10 is a fragmentary exploded isometric view of the retentive clip used with the alternative embodiments of FIGS. 6 and 12.

In operation, the free edge 225 of the clip 221 is bent outward as shown in FIG. 10 to allow positioning the edges 227 of the panels 270, 312 between the attached arm 229 and free arm 231 of the clip 221. Thus the clips 221 serve to retain the panels 268, 270, 310, 312 against the rear seat back surfaces 28.

Figure 12:
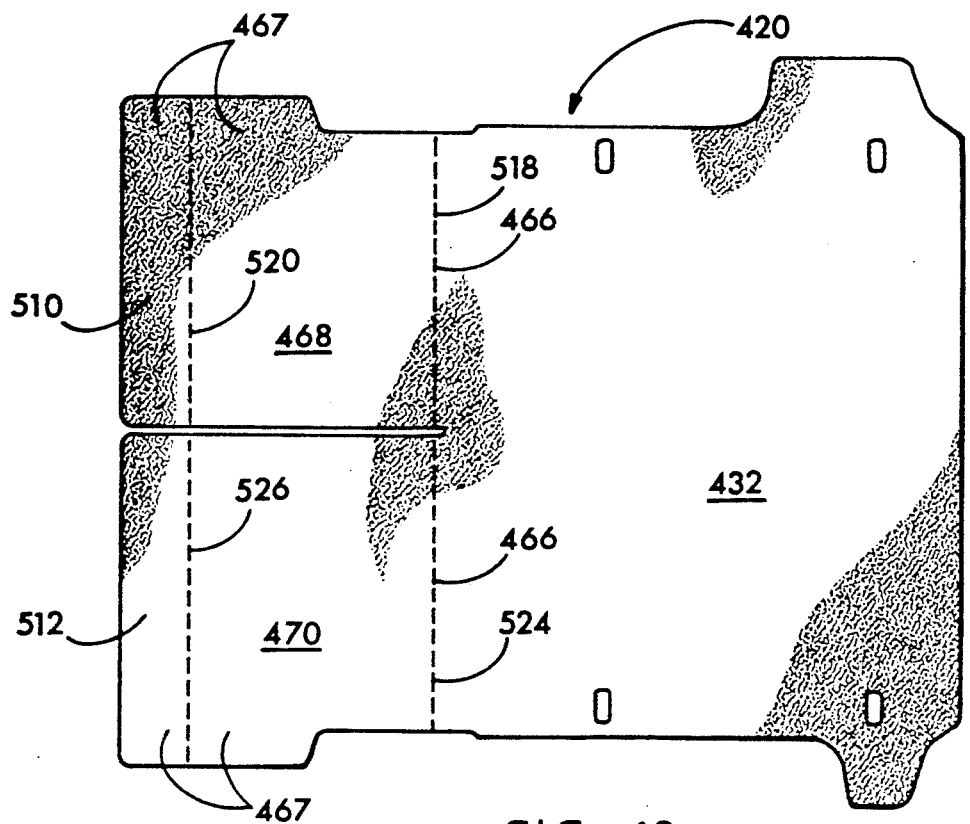
FIG. 12 is a top plan view of an alternative embodiment of the floor liner of this invention for use in a two-door sports utility vehicle.

FIG. 12 shows how a liner 420 similar to the liner 220 may be adapted to function with a three-door sports utility vehicle (not shown), wherein a smaller increase in the length of the cargo bed results in a shorter recumbent flap.

The floor liner 420 is similar to floor liner 220 in having a forward extension 467 composed of two sets of two panels, right cargo extension panels 468 and left cargo panels 470 and right recumbent panels 510 and left recumbent panels 512. The recumbent panels 510, 512 are joined to the extension panels 468, 470 by double living hinges 520, 526. The cargo extension panels 468, 470 are joined to the forward end 466 of the floor panel 432 by double living hinges 518, 524. The design of the floor liner 420 is accomplished similarly to the floor liner 220 by making the cargo extension panels 468, 470 of sufficient height to extend to the tops 132 of the rear seat backs 106, 108. The recumbent panels 510, 512 are then chose with a length equal to the difference between the cargo area 26 and the extended cargo area 130. The extension length of the recumbent panels 510, 512 is considerably less than in the floor liner 220 of FIG. 6 because of the shorter cargo area 26 of the 3 door sport utility vehicle (not shown)

The floor liner 420 does not utilize the spring loaded cargo bed extension flap 98 to position the forward extensions 467 of the floor liner 420 against the rear seat back surfaces 28. Rather the clips 221 are employed similar to those shown in FIGS. 7, 10 and 11. The clips 221 serve to retain the panels 468, 470, 510, 512 against the rear seat back surfaces 28.

It is understood that the invention is not confined to the particular construction and arrangment of parts herein illustrated and described, but embraces such modified forms thereof as come within the scope of the following claims.

I claim:

1. A unitary protective plastic liner for protecting interior coverings in a cargo area of a vehicle having a floor and a foldable rear seat back, the liner comprising:
    a) a first floor lining panel which is adapted to substantially cover the floor of a vehicle;
    b) two cargo extension panels which extend forward of the first floor lining panel, wherein each panel is pivotally joined to the first floor lining panel by a double living hinge formed of two parallel closely-spaced living hinges; and
    c) each cargo extension panel having a recumbent panel joined to a forward portion of said cargo extension panel by a double living hinge.

2. The liner of claim 1 further comprising a resilient clip mounted to the vehicle rear seat back which engages a recumbent panel to the seat back in an upright position.

3. The liner of claim 2 wherein the clips are releasably attached to a carpet lining on the seat back by means for fastening and wherein the clip has a resilient U-shaped portion for retaining the first panels and the recumbent panels.

4. The liner of claim 1 wherein each recumbent panel has a seat back panel connected to a forward edge thereof by a double living hinge formed of two parallel, closely-spaced living hinges.

5. The liner of claim 1 wherein the first floor lining panel has portions defining access holes for cargo hooks.

6. The liner of claim 1 wherein the liner is formed of extruded roll formed high density polyethylene.

7. A protective plastic liner for protecting interior coverings in a cargo area for a vehicle having two independently foldable seat backs adjacent to a rear cargo area having a floor, the liner comprising:
    a) a first floor lining panel adapted to substantially cover the floor of a vehicle, the first panel having a forward end, a rearward end, and two sides;
    b) portions of the first panel which form two opposed sidewardly extending ears adjacent to the rearward end and extending forward, wherein the ears are adapted to underlie two opposed wheel well trim panels;
    c) two cargo extension panels integrally joined to the first floor lining panel forward end, the two panels being joined to the forward end by a double living hinge formed of two closely-spaced parallel living hinges;
    d) each cargo extension panel having a recumbent panel extending forwardly from said cargo extension panel and pivotally joined to said cargo extension panel by a double living hinge formed of two parallel closely spaced living hinges.

8. The liner of claim 7 wherein each of the recumbent panels has a seat back panel connected to a forward edge thereof by a double living hinge formed of two parallel closely spaced living hinges.

9. The liner of claim 7 wherein the first floor lining panel has portions defining access holes for cargo hooks.

10. The liner of claim 7 wherein the liner is formed of extruded roll formed high density polyethylene.

11. In a vehicle having a rear cargo area with interior coverings and a floor, and a protective plastic liner for protecting the interior coverings of a cargo area, wherein the vehicle has two independently foldable seat backs adjacent to the cargo area, and opposed wheel well trim panels covering wheel wells disposed along the side of the cargo area wherein the improvement comprises a unitary plastic liner comprising:
    a) a first floor lining panel which substantially covers the cargo floor of the vehicle, the first panel having a forward end, a rearward end, and two sides;
    b) portions of the first floor lining panel sides which define two opposed, sidewardly-extending ears adjacent to the rearward end of the first floor lining panel, the sides extending forward and underlying the two opposed wheel well trim panels;
    c) two second panels integrally joined to the forward end of the first panel, the two panels being joined to the first panel forward end by a living hinge;
    d) each second panel having a third panel which extends frontwardly from said second panel and is joined to said second panel by a living hinge.

12. The liner of claim 11 where at least one of the living hinges between the panels is a double living hinge formed of two parallel, closely-spaced living hinges.

13. The liner of claim 11 wherein each third panel has a fourth panel which extends forwardly from said third panel, and wherein each fourth panel is joined to said third panel by a double living hinge formed of two parallel, closely-spaced living hinges, and said fourth panel is adapted to overlie a seat back.

14. The liner of claim 11 further comprising portions of the first floor lining panel which define access holes for cargo hooks.

15. The liner of claim 11 wherein the liner is formed of extruded roll formed high density polyethylene.

16. In a vehicle having a rear cargo area, a foldable seat with a back adjacent to the cargo area, and a spring-loaded extension flap extending from the cargo area, an improved protective plastic liner for protecting interior coverings comprising:
 a) a first panel which substantially covers the rear cargo area of the vehicle, and which has a first forward end, a rearward end, and two sides;
 b) at least one second panel integrally formed with and pivotally joined to the first panel forward end, wherein the second panel has a forward edge;
 c) at least one third panel integrally formed with and pivotally joined to the forward end of the second panel, and having a forward end;
 d) at least one fourth panel integrally formed with and pivotally joined to the forward end of the third panel, wherein the extension flap is engaged between the second panel and the third panel when the seat is in an upright position, and urges the fourth panel against the seat back, and wherein the second panel overlies the extension flap when the seat is in a collapsed, downwardly folded position.

17. The vehicle and liner of claim 16 wherein:
 a) the second panel has a length in the forward direction;
 b) the third panel has a length in the forward direction; and
 c) the fourth panel has a length in the forward direction; and wherein the length of the second panel plus the length of the fourth panel, less the length of the third panel is equal to approximately the height of the rear seat back so that when the seat is upright, the liner does not extend above the seat, and when the seat is in a recumbent position, the liner unfolds to cover the seat back.

18. The liner of claim 16 wherein the liner is formed of extruded roll formed high density polyethylene.

19. A protective plastic liner for protecting interior coverings in a cargo area for a vehicle having two independently foldable seat backs adjacent to a rear cargo area, the liner comprising:
 a) a first floor lining panel adapted to substantially cover the cargo area of a vehicle, the first panel having a forward end, a rearward end, and two sides;
 b) two cargo extension panels integrally joined to the first floor lining panel forward end, the two panels being joined to the forward end by a living hinge;
 c) each extension panel having a recumbent panel extending forwardly from said cargo extension panel and pivotally joined to said cargo extension panel by a living hinge;
 d) each cargo recumbent panel having a seat back panel extending forwardly therefrom and pivotally joined to said recumbent panel by a living hinge, wherein: i) the cargo panel has a length in a forward direction; ii) the recumbent panels have a length in the forward direction; and iii) the seat back panel has a length in the forward direction; and wherein the length of the cargo panel plus the length of the seat back panels, less the length of the recumbent panel is equal to approximately the height of the rear seat back so that when the seat is upright, the liner does not extend above the seat, and when the seat is in a recumbent position, the liner unfolds to cover the seat back.

20. The liner of claim 19 wherein the liner is formed of extruded roll formed high density polyethylene.

* * * * *